Patented Aug. 12, 1924.

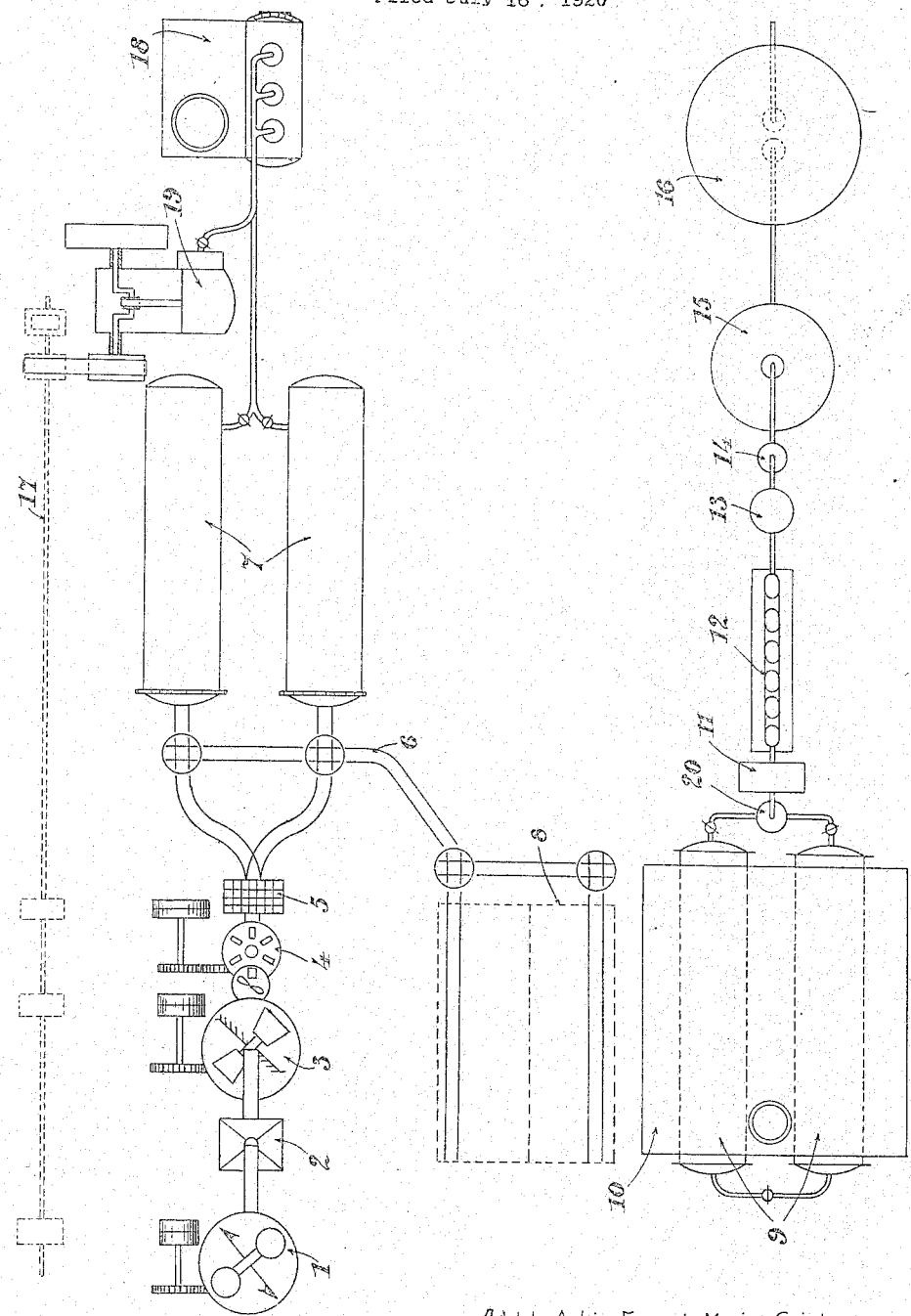

1,504,385

UNITED STATES PATENT OFFICE.

ADOLPHE ANTOINE FRANÇOIS MARIUS SEIGLE, OF PARIS, FRANCE.

METHOD FOR DISTILLING AND GASIFYING PEAT AND LIKE SUBSTANCES.

Application filed July 16, 1920. Serial No. 396,768.

(GRANTED UNDER THE PROVISIONS OF THE ACT OF MARCH 3, 1921, 41 STAT. L., 1313.)

*To all whom it may concern:*

Be it known that I, ADOLPHE ANTOINE FRANÇOIS MARIUS SEIGLE, citizen of the Republic of France, residing at 3$^{bis}$ Rue Clement Marot, Paris, in the Republic of France, have invented new and useful Improvements in Methods for Distilling and Gasifying Peat and like Substances, of which the following is a specification.

This invention consists in an industrial cycle for obtaining the dehydration, agglomeration, distillation and also the gasifying of black or stratified peat or even porous peat, as well as imperfect lignites or xyloids, that is, more or less approaching to peat.

Aside from the general results which have just been summarily indicated and which will be further set forth, the new process for distillation and gasifying of more or less peaty substances will provide, by an increase as well as an improved method for manufacturing certain by-products, a very economical realization of a combination of industries which are thus made to cooperate. This combination is susceptible of productive and important applications in almost all countries of the globe, since considerable deposits of indispensable raw material are to found therein, as well as advantageous markets.

In fact, the said industrial cycle is as easy to realize as that of many of the leading modern industries, but an exposition of its principles, its evolution and its results must necessarily involve a certain complexity without preventing a sufficient comprehension of the invention and its industrial purposes.

Moreover, as is well known by all engineers and chemists who have devoted some attention to the matter, the important problem of a really sufficient and practical utilization of the enormous industrial and economic value which from now on is represented by the peat beds, is of itself of a complex and difficult nature.

The difficulties met with in general by the various methods of utilization of peat which are current at the present time is due to various causes, and chiefly to the strongly hygroscopic nature of peat. This fuel contains in the crude state often more than 90 per cent of water, and after natural or artificial drying, it again partially but rapidly absorbs its original water, so that the percentage of water in any variety of peat, even when previously dried or agglomerated by industrial methods, is never below 18 or 20 per cent, immediately it is exposed to practically free air.

On the other hand, it has been recently demonstrated by careful observation that carbonized peat, that is, peat transformed into coke or coal, even when this is carried out by electric heating or other improved means, still retains its hygroscopic nature and all the serious drawbacks connected therewith.

One of the other causes of the above mentioned failures resides in the high proportion of ash which peat usually possesses. This proportion rarely falls below 6 per cent and it may even reach as high as 20 or 30 per cent.

It should also be added that ash of this kind contains chiefly clay and limestone, with variable proportions of calcium sulphate and small proportions of alkaline salts.

It would be useless to proceed any further with the consideration of the difficulties involved in a really satisfactory utilization of peat, but one conclusion which may be already arrived at is that the undoubted economic value presented by this fuel does not by any means consist in its direct and necessarily limited use for heating and for metallurgical purposes either in the shape of briquettes or balls, or again in the crude state after sufficient drying or carbonization.

In fact, given the possibility of obtaining by-products for which a good market is assured, any peat deposit of substantial size should be operated after the manner of an important chemical industry. Such is the tendency which has been observed within a recent period in Sweden, Italy, Canada, Germany and other countries for operation of peat bogs on a large scale.

But as will be further set forth, the industrial cycle which characterizes the process forming the object of this invention is intended to improve and develop this new industrial field for utilization of peat and like chemical substances such as the imperfect lignites or in other words the xyloid lignites.

The said industrial cycle comprises the successive operations to be hereinafter described in the normal order of realization or practically so. The annexed drawing shows in plan view an example of installation for the industrial realization of the improved method.

The process starts with raw peat, that is in the state in which it is obtained by the customary operations of drainage and extraction. It is then reduced to a sufficiently ground pulp in a suitable machine, according to the method in current use in peat bogs which are worked on anything approaching an industrial scale.

According to the more or less hygrometric state of the peat employed and that of the atmosphere, it is advantageous to submit the said pulp to a preliminary drying by a simple exposure to the air or better still by making use of the heat lost in an industrial cycle properly so called.

However, the sufficient dehydration of the peat will be especially produced by two thermo-chemical reactions which will be successively employed, in the first place the well known slaking of the anhydrous oxide of calcium or quicklime, and secondly the formation of hydrosilicates of calcium and like hydrosilicates under the action of water vapor under pressure and saturated.

As is well known, anhydrous lime combines very rapidly with a weight of water almost equal to one third its own weight, giving rise to a large amount of heat, and moreover, the pulverulent hydrate thus obtained will still absorb water in considerable amount.

If required, the anhydrous or fat lime can be replaced by unslaked hydraulic lime.

This special use of the phenomenon of the slaking of quicklime is in this case completed by first adding a small amount of melted and granulated chloride of calcium to the quicklime (this latter being also granulated or finely ground) before incorporating the same into the peat pulp. The high absorption of water possessed by chloride of calcium is well known.

On the other hand, the partial drying of the said pulp is obtained by mixing the latter with determined quantities of carbonate of calcium and silicious matter in powdered form, but this important operation as well as the addition of a small amount of chloride of calcium (with or without the addition of like chlorides) have for their principal objects the thermo-chemical reactions and the industrial results which will be successively set forth.

It should in the first place be observed that the various operations of mixing and grinding as above mentioned can be effected in any of the grinders, pulverizers, mixers or the like which are in current use in the manufacture of fuel briquettes or balls, or like agglomerated products employed in building operations, metallurgy, chemical industries, etc.

It is understood that as in the present case the question relates to a process for utilizing thermo-chemical reactions, it is absolutely essential to be able to obtain data from previous analyses as concerns the precise chemical composition of the peat itself, of the quicklime, the carbonate of calcium, etc.

It is necessary in the first place to ascertain the proportion of carbon in the free or uncombined state on the one hand, and on the other hand the proportion of oxide of calcium and of clay or silica in the required state for obtaining a good quality of hydraulic lime or in other cases granulated cement or other like cement.

In this connection it is useful to take note of what has been already stated as regards the usual proportion of clay, carbonate of calcium and other impurities contained in peat.

Aside from obtaining the relatively secondary results which have just been set forth, the various operations described and especially those which are hereinafter set forth have for their object to obtain the three other following important results:

A. Firstly, the maximum extraction of condensable hydrocarbons and the production of ammoniacal, methylic or acetic solutions.

B. Secondly, the complete gasification of the entire amount of carbon and other combustible elements which are not carried off with the condensable or soluble products just mentioned.

C. Thirdly, the recovery as the only product or residue in the solid state, of a certain quantity of hydraulic lime or cement whose amount and quality depend upon the chemical composition of the peat and other raw materials utilized.

Having thus reviewed the leading features of the invention from a theoretical and practical point of view, a more complete exposition of its technical principles and industrial results will be given—only by way of example—by a description of an application having a more or less general nature, and to this end, the question will relate to the operation of an extensive deposit of black peat containing an average amount of clay and limestone as well as negligible amounts of other impurities.

In conformity to the various indications hereinbefore set forth, this peat is reduced to pulp and on the other hand carbonate of calcium, quicklime and fused chloride of calcium is rather finely powdered or granulated, in a crusher numbered 1 on the drawing but it is understood that for these last two substances it is required to proceed in such manner as to preserve them from all hydration until the moment when they are added to the peat pulp in silos of oxychloridation 2 and in mixers 3. This last operation can be carried out in conjunction with or preferably posterior to that of the mixture of the pulp with the carbonate of calcium.

Taking as a base their chemical analyses previously carried out as above stated, it is required to establish the exact proportions of addition or mixture of the various raw materials. In the case here specified, it is supposed in the first place that there is employed a sufficiently pure and dry carbonate of calcium, a good quality of fat lime in the anhydrous state and a chloride of calcium also in the dehydrated state; and secondly, that the percentage composition of the peat pulp employed is as follows:

33 per cent water, hydrometric.
23 per cent of other volatile substances.
31 per cent non-combined carbon.
9 per cent clay.
4 per cent limestone.

Care should be taken:

1. That there should exist, by weight, a somewhat larger amount of free carbon in the peat pulp than combined carbon in the entire amount of the carbonate of calcium either added or already contained in the pulp, or, in other terms, the available quantity of fixed carbon in the peat must be greater than that which is strictly necessary for transforming the carbon dioxid contained in the carbonate of calcium into carbon monoxid, and this in view of the decomposition of the water contained in the hydrosilicate of calcium as will be seen hereinafter.

2. That the proportion of oxide of calcium and clay or like silicious substances shall be suitable for producing a good hydraulic lime.

By the coordination of the technical data which have been just mentioned, the following mixture is resorted to:

100 kilogrammes of the pulp in question.
225 kilogrammes of good fat limestone in a practically powdered state.
44 kilogrammes of clay and silica or silicates either in the powdered or pulverized state.
28 kilogrammes of pulverized fat quicklime.
3 kilogrammes of granulated chloride of calcium or similar chlorides.

The required mixing and storing of these 400 kilogrammes of various substances is carried out in the same manner and with the same machines, silos and the like as for the substances employed in modern production of material such as silico-calcareous substances hardened in the digester.

The following conditions must then be obtained:

1. The mortar resulting from these different operations is uniformly in a relatively dry rather than in a moist state, by reason of the very complete slaking of the quicklime by the absorption of a considerable portion of the hygrometric moisture of the peat pulp, etc.

2. All the components of the said mortar should be very regularly mixed and distributed throughout the entire mass. Should this not be the case, it would be required to carry out the mixing a second time. When the mortar has been brought into the required condition as just stated, it is molded into bricks or egg-shaped balls by means of strong presses 4 such as are used in the manufacture of agglomerated coal and the like.

As these bricks or balls are produced, they must be stowed or piled with care upon small cars 5, running on a narrow gauge line 6 or in baskets, and should only be taken therefrom after their rapid hardening by the physico-chemical result of the following operations:

In the first place, by reason of a chemical combination which takes place with a certain slowness, there are formed within these agglomerates certain filiform crystals of a strongly hydrated oxychloride of calcium, and this already increases the somewhat insufficient hardness of these agglomerates.

After allowing them to rest under shelter for at least half a day, the agglomerates are brought into digesters 7, of the type in common use, wherein they are submitted to the action of steam under pressure and saturated, under the usual conditions and to obtain the hardening (now a standard in France as elsewhere) of the silico-calcareous bricks by the formation of hydrosilicate of calcium and similar hydrosilicates under the action of the steam under a pressure of at least 6 kilogrammes per square centimeter during 8 to 10 hours. The steam under pressure may come from the boilers 18 producing the necessary steam for the working of the engine 19, actuating all the transmissions 17 of the installation.

Under these circumstances, the action of saturated steam at a sufficiently high pressure has the result not only of completing the requisite hardness of the agglomerates having the above mentioned composition, but also of giving rise to interesting modifications of the peat pulp which is thus treated.

In the first place the hydro-cellulose is transformed into a rather permeable matter whose water cooperates in the formation of hydrosilicate of calcium which now surrounds the fibres of the peat by reason of a superficial but clearly chemical connection between this hydrocellulose and the hydrosilicate of calcium thus formed.

But it should not be forgotten that hydrosilicate of calcium is insoluble and scarcely permeable in a cold state, and on the other hand that it only gives up its chemically combined water at a low red heat or upwards. It is proposed to subsequently utilize certain technical consequences of this latter chemical property of hydrosilicate of calcium.

Another result of the action of steam under pressure and the affinities for calcareous compounds which it confers upon silicic acid, resides in the fact that it renders the components of the peat deriving from ulmic acid more or less subject to disintegration by the atoms of chlorine which are freed by the silicic acid acting upon the chloride of calcium.

This secondary attack upon the peat fibres increases the surrounding of the same by the hydrosilicate of calcium formed in the above stated manner.

On the whole, the agglomerates of peat pulp which are thus hardened and rendered sufficiently insensible to the action of humidity may firstly be utilized at once or secondly stored up in storage 8 for a considerable length of time and in such manner that it will be possible to distil and gasify during the whole of the bad season a large stock of bricks or balls manufactured during the periods when the good weather favors an active production of peat pulp which is previously more or less dried.

An explanation will now be given of the method employed for a rational distillation and subsequent active production of gas from the present agglomerates.

In the first place, they are heated very slowly to a temperature of about 550 to 560° C. at a maximum and are thus maintained until the end of the distillation period proper, which may last for 15 to 20 hours according to the volume of material employed.

This operation and the consecutive gas production can be effected either by means of horizontal gas retorts 9 heated in a furnace 10 which is installed for instance in the same manner as for coal gas works, or by means of vertical retorts disposed for instance as in the Ziegler furnace for carbonizing peat, or by the use of the so-called Belgian type of furnace for producing coke for metallurgical purposes, or by any other suitable disposition for carrying out the double purpose in view, that is for effecting the slow and methodical distillation of agglomerates up to the said temperature of 550 to 580° C.

This is followed by a short period of baking or strong calcination, up to a temperature of approximatively 1100 to 1200° C. But said intermediate short period may be suppressed if only small quantities of agglomerates are treated.

It should be observed in passing that the gases of combustion leaving a furnace or a portion of the same in which this final heating is effected to a high degree, are still at a sufficient temperature to be employed in another furnace or a second portion thereof to carry out a preliminary heating or a simple distillation.

In any event, it now becomes feasible to realize in a very economical manner the complete heating by successive stages as already mentioned, and chiefly by employing in any of the standard dispositions of heat recuperation furnaces only a small portion of a very large volume of permanent gas which is one of the products of the molecular or atomic exchanges taking place between the different components of the agglomerates during the final period of treating the same at a high heat.

A brief summary will now be given of the successive thermo-chemical or simply physical results obtained in the two consecutive periods of distillation and calcination, but it will be unnecessary to furnish explanations concerning the use and effects of the various additional apparatus for suction and delivery, condensation, purifying, collecting, and the like, employed for the condensable or non-condensable volatile products, since these are of the same nature as those which are in current in the industry of carbonization of and gas production from peat or in other industries of a like nature. For instance and as shown on the drawing, the gases coming out from the retorts 9 will pass and be washed and purified, through the hydraulic main 11, the set of vertical pipes 12, baffle purifier or like apparatus 13, scrubler 14, and sulphur separator or like apparatus 15, and finally will be collected in a gasholder 16.

As concerns the operation of slaking, sifting, and if necessary of grinding and bagging of the hydraulic lime and granulated cement which constitute the only solid products or residues of the agglomerates after their final calcination, no further mention need be made at this juncture, since they present no special features and resemble the current practice which is employed in the well known manufacture of hydraulic lime and granulated or other cements.

During the first period of heating, or otherwise stated, that of the distillation, there will exist between the temperature of approximately 110° C. up to the above mentioned temperature of 550 to 580° C., a rather abundant production of condensable vapors, and these when collected by cooling or other well known means will furnish liquids of the same kind as are obtained by the current methods of carbonization of peat in a closed receptacle, that is, chiefly ammoniacal water containing a greater or less amount of acetic acid and methyl alcohol, and on the other hand coal tars especially containing heavy hydrocarbons.

Moreover, in the process now under consideration a small amount of carbonic acid gas is already given off near the end of this first period of heating.

This disengagement of gaseous molecules whose quantity gradually increases, already acts to facilitate the regular disengagement of the hydrocarbon vapors of the peat and also in a certain degree to cause them to be more regularly disengaged, which vapors distil in much greater quantity after 250° C. than before this point.

On the other hand, the discharge of these hydrocarbons is also facilitated and even rendered sufficiently rapid by reason of the finely divided state of the relatively small mass of the peat, which is distributed in each of the agglomerates in the proportion of about only one quarter of the total mass.

But this facility and especially this rapidity of the successive evacuations of the various hydrocarbons as soon as the special temperatures of distillation peculiar to each are attained, have the result of almost entirely suppressing the effects of pyrogenation which in the usual processes for carbonization of peat will inevitably result in a considerable decomposition of the above mentioned hydrocarbons, on the one hand into gaseous and consequently non-condensable products and on the other into coal tars of a viscous nature and containing a very large amount of uncombined carbon.

Briefly stated, it will be seen that by means of the new process as herein set forth, it is possible to obtain a very advantageous increase in the production of condensable hydrocarbons which contain but a relatively small amount of combined or uncombined carbon.

Between the period of distillation proper and the final or gas producing period, there exists a transition period of heating which is rendered as short as possible by increasing the action of the furnace plant without however causing the retorts or the walls of the furnace to be subjected to cracking by reason of a too sudden rise of temperature.

During this transition period, the already mentioned disengagement of carbon dioxide gas will continually increase, but without reaching any considerable degree. On the other hand, a certain small amount of hydrocarbons which become less and less condensable will still be given off, as well as a small quantity of vapor resulting from the water of chemical composition of the hydro-silicate of calcium whose formation and special properties have been already explained.

In order to restrain during this period all production of gases or vapors, the action of the extractors or suction devices upon the retorts or the like is reduced as far as possible, the discharge from which should not momentarily be effected into the apparatus of condensation, purifying and final collecting, contrary to what takes place during the two normal periods of distillation and calcination.

As it has been hereinbefore mentioned, if only small quantities of agglomerates are treated, the intermediate short period of heating may be suppressed; but if such a period is used, it is in fact most advantageous not to discharge in this manner the mixture of carbonic acid, hydrocarbons and water vapor which is produced during this transition period of heating.

This mixture can be utilized to advantage by delivering it into one or more retorts or like devices which also contain agglomerates constituted and manufactured as above stated, but which have been previously subjected for a certain time to a temperature of 1100 to 1200° C.

To resume the operation will be carried out by means of at least two retorts, or preferably by the use of two sets of retorts or like devices, either of which can be employed at the desired moment for the utilization or the recovery of the products in question.

To finish the description of the thermo-chemical cycle of operations, an explanation will be given of the action which takes place during the final period of heating, that is, the period of calcination and complete gasifying, which lasts for 8 or 10 hours during which time the temperature must be maintained between 1100 and 1200° C. since it is desired to obtain a single residue in the solid state consisting of a hydraulic lime of as regular a character as possible and consequently not baked to an unduly great extent.

It is of course understood that if it were desired to produce cement properly so called, it would be required to finally reach a higher degree of calcination, in fact at about 1500° C., and on the other hand, it would be necessary to make use of another percentage of clay or silicious matter in the agglomerates.

In any event, the said temperature of 1100 to 1200° C. is still very favorable to the realization of the thermo-chemical effects which are specified below, and which in this case will occur in a practically simultaneous manner between the substances, gases or vapors under reaction:

1. Termination of the disengagement of carbonic acid, of the oxide of the carbonate of calcium, and the transformation of the same into hydraulic lime with the partial formation of anhydrous silicates or silico-aluminates, this hydraulic lime being the sole matter finally remaining in the retorts or like devices.

2. Termination of the disengagement of the water of chemical composition of the hydrosilicate of calcium which causes the hardening of the agglomerates, the said hydrosilicate, when thus dehydrated, will thenceforth cooperate in the formation of the above mentioned silico-aluminates or anhydrous silicates.

3. By reason of atomic exchange reactions occurring between:

(a) The fixed carbon of the peat and the occasional hydrocarbons which have resisted the distillation proper.

(b) The hydrogen and the oxygen of the water of chemical composition of the hardening hydrosilicate.

(c) The carbonic acid of the entire amount of carbonate of calcium entering into the composition of the agglomerates and having resisted the effects of the distillation proper.

Lastly, the process involves the formation of a combustible gas consisting especially of carbon monoxide, a small amount of free hydrogen and of non-condensable hydrocarbons.

The amount of carbonic acid therein contained is reduced to the minimum amount obtainable in the industrial manufacture of carbon monoxide, since the temperatures required to effect any considerable cracking of this latter gas into carbon and carbon dioxide are (as is well known to specialists in this manufacture) much below the temperature at which the present gasifying is carried out, and also for the reason that the said carbon monoxide becomes continually more stable as the temperature increases.

On the other hand, it will be observed that no nitrogen is present in the normal composition of the special gas which is thus produced, which therefore renders it much more advantageous than the gas produced in peat gas generators of well known systems as well as other producer gas, in most of the applications in which these various industrial gases are utilized to a very considerable extent, especially for use in power plants.

In certain cases, such for instance in which the devices for distillation and calcination contain but a single set of retorts or a single horizontal retort of a small or a very large capacity, this will afford the means of obtaining the recuperation of vapors and gases as in the transition period above specified.

The duration of this intermediate phase can also be diminished without an unduly great loss of carbonic acid, by continuing the period of the distillation proper as high as 675 or 700° C.

The mixture of the carbonic acid of water vapor and of hydrocarbons which is then given off up to the beginning of period of calcination is then freed from substantially the entire amount of its carbonic acid and its water vapor, by reason of their transformation into oxide of carbon and hydrogen resulting from the atomic changes as already set forth, these being facilitated in the present conjuncture by causing the said mixture to pass through a cylinder of refractory matter of some length 20 filled with fragments of porcelain which are maintained at an orange red heat.

Care should be taken to give to this cylinder but a small degree of permeability to very light hydrocarbons as well as hydrogen in order not to lose too great a quantity of these gases which have a high calorific power.

It is obvious that the process hereinbefore described may be used, instead of peat, with carbonaceous material, such as imperfect lignites, containing a relatively low proportion of carbon, without departing from the invention.

Having now described my invention, what I claim as new and desire to secure by Letters Patent is:

1. A process for utilizing peat for the production of gas and plastic material, which consists in preparing agglomerates with a pulp of peat and substances suitable for the production of a good quality of hydraulic lime, treating the said agglomerates in a digester by means of saturated steam under pressure for the purpose of hardening said agglomerates by producing crystals of hydrosilicate of calcium, then heating the agglomerates in the first place at a slow rate up to a maximum of 550° C. and recovering the distilled products, and finally heating between 1000° and 1200° to complete the gas production and the calcination according to the desired production of hydraulic lime.

2. A process for utilizing peat for the production of gas and plastic material, which consists in preparing agglomerates with a pulp of peat and substances suitable for the production of a good quality of hydraulic lime, treating the said agglomerates in a digester by means of saturated steam under pressure for the purpose of hardening said agglomerates by producing crystals of hydrosilicate of calcium, then heating the agglomerates in the first place at a slow rate up to a maximum of 550° C. and recovering the distilled products then employing a transition stage involving the shortest possible heating while restricting the production of gases and vapors to the greatest possible degree, and finally heating between 1000° and 1200° to complete the gas production and the calcination according to the desired production of hydraulic lime.

3. A process for utilizing peat for the production of gas and plastic material, which consists in preparing agglomerates with a pulp of peat, carbonate of calcium, a silicious substance, quicklime, and chloride of calcium, treating the said agglomerates in a digester by means of saturated steam under pressure for the purpose of hardening said agglomerates by producing crystals of hydrosilicate of calcium, then heating the agglomerates in the first place at a slow rate up to a maximum of 550° C. and recovering the distilled products, then employing a transition stage involving the shortest possible heating while restricting the production of gases and vapors to the greatest possible degree, and finally heating between 1000° and 1200° to complete the gas production and the calcination according to the desired production of hydraulic lime.

4. A process for utilizing peat for the production of gas and plastic material which consists in preparing agglomerates with a pulp of peat, and substances suitable for the production of a good quality of cement, treating the said agglomerates in a digester by means of saturated steam under pressure for the purpose of hardening said agglomerates by producing crystals of hydrosilicate of calcium, then heating the agglomerates at a slow rate up to a maximum of 550° C. and recovering the distilled products, and finally heating between 1000° and 1500° C. to complete the gas production and the calcination, according to the desired production of cement.

In testimony whereof I have signed my name to this specification.

ADOLPHE ANTOINE FRANÇOIS MARIUS SEIGLE.